(No Model.) 2 Sheets—Sheet 1.
J. MARIS.
VEHICLE HUB.
No. 317,159. Patented May 5, 1885.
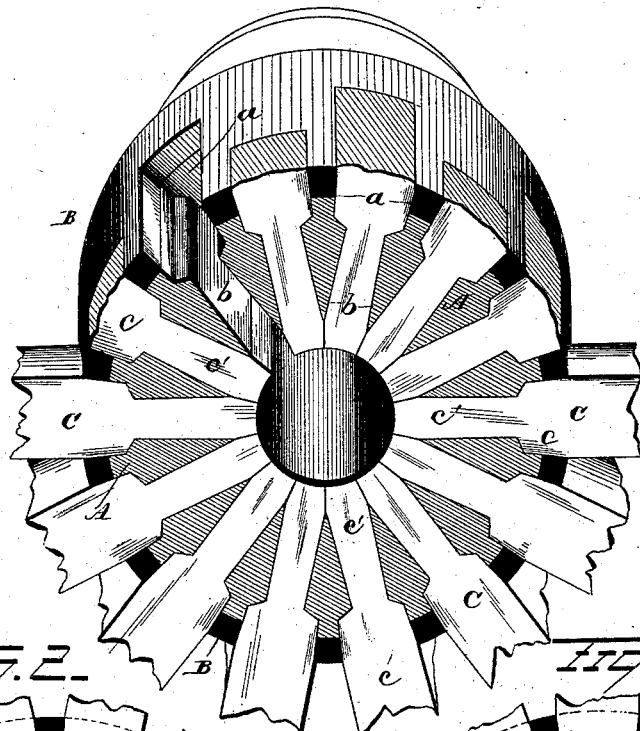
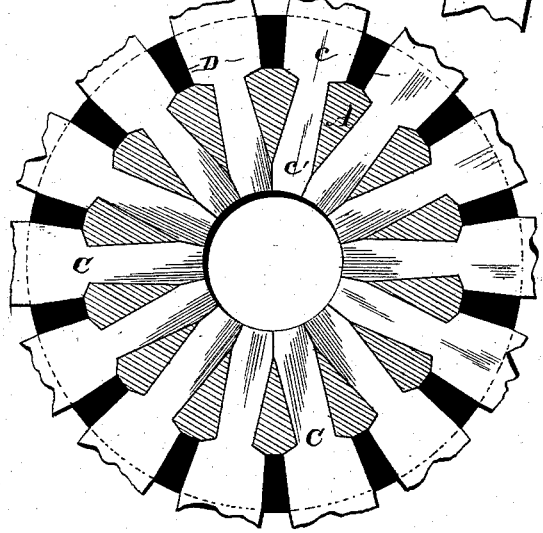
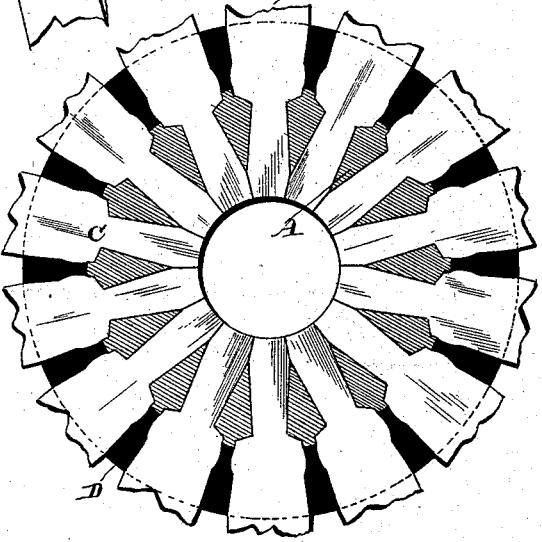
WITNESSES
INVENTOR (No Model.) 2 Sheets—Sheet 2.

J. MARIS.
VEHICLE HUB.

No. 317,159. Patented May 5, 1885.

WITNESSES
E. Nottingham
Geo. F. Downing.

INVENTOR
Jared Maris.
By H. A. Seymour
Attorney

United States Patent Office.

JARED MARIS, OF PHILADELPHIA, PENNSYLVANIA, ASSIGNOR TO THE ACME HUB COMPANY, (LIMITED,) OF DAYTON, OHIO.

VEHICLE-HUB.

SPECIFICATION forming part of Letters Patent No. 317,159, dated May 5, 1885.

Application filed February 19, 1885. (No model.)

*To all whom it may concern:*

Be it known that I, JARED MARIS, of Philadelphia, in the county of Philadelphia and State of Pennsylvania, have invented certain new and useful Improvements in Vehicle-Hubs; and I do hereby declare the following to be a full, clear, and exact description of the invention, such as will enable others skilled in the art to which it appertains to make and use the same.

My invention relates to an improvement in vehicle-hubs, the object of the same being to provide means for securely fastening the spokes to the hub, whereby all danger of the spokes working loose either from shrinkage or otherwise is obviated; and with this end in view my invention consists in the parts and combinations of parts, as will be more fully described, and pointed out in the claims.

Figure 4:
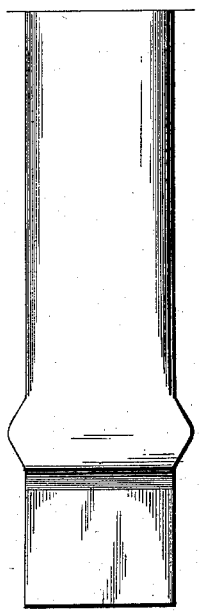
Figure 5:
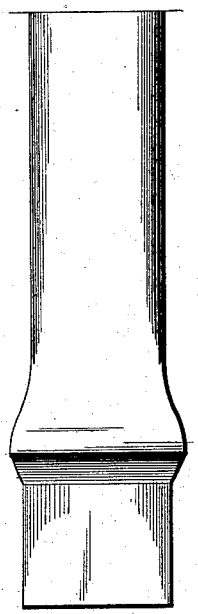
Figure 6:
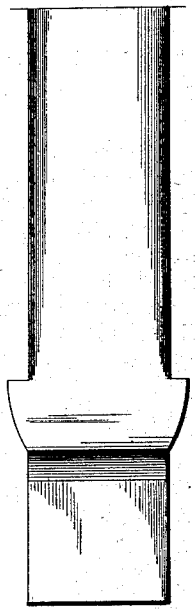
Figure 7:
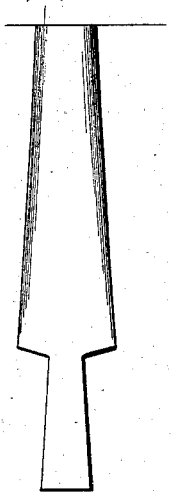
Figure 8:
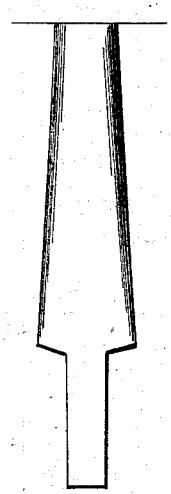

In the accompanying drawings, Figure 1 is a view in transverse section of a hub embodying my invention. Fig. 2 is a similar view of a hub, the hub-band of which is provided with inwardly-projecting ribs. Fig. 3 is a similar view of a hub and ribbed hub-band, the latter having undercut sides. Fig. 4 is a view in side elevation of a portion of the spoke, showing one form of tenon before it is compressed. Figs. 5 and 6 show other forms of tenons. Fig. 7 is an end view of another form of tenon; and Fig. 8 is a view of a spoke, showing the tenon compressed.

A represents the hub provided with the outer series of sockets, $a$, and an inner series of smaller sockets, $b$, each of said latter sockets communicating with a larger socket, $a$, and forming seats for the double-tenoned spokes. These double sockets are formed in the usual manner, and arranged in "stagger" order, or in a straight line around the hub, and the latter is strengthened and protected by the metallic band B, having a series of openings therein corresponding in shape and size to the outer series, $a$, of the sockets. This band can be made to cover more or less of the outer surface of the hub, as desired.

The spokes C are provided at their inner ends with the double tenons $c\ c'$, the former of which is slightly larger than the sockets $a'$, while the latter are slightly larger than the sockets $a$. The tenons $c$ can be of the shapes shown in Figs. 4, 5, and 6; or, instead of projecting at the opposite ends, as shown in said figures, can be made larger transversely, as shown in Fig. 7; or they can be enlarged in both directions, if desired. The smaller tenons $c$ can also be enlarged either sidewise, edgewise, or both, and, as before stated, are in their normal conditions larger than their corresponding sockets. These tenons, just before they are inserted into their respective sockets, are compressed either by a press or other device until they are reduced in size sufficiently to permit them to be driven into position. After they are driven home the tenons expand, and the larger tenons $c$ take under the edges of the band $b$ and form a strong, tight, and compact union between the parts, which prevents the possibility of the spokes becoming loosened.

Instead of providing the hub with a plain metallic band, B, as shown in Fig. 1, the band can be provided with inwardly-projecting ribs D, arranged longitudinally between the spoke-openings. These ribs are preferably wedge shape in cross-section, and their side faces can be perfectly plane, as shown in Fig. 2; or they can be undercut, as shown in Fig. 3. In this latter instance the outer or larger tenons in swelling fill up the undercut portions of the rib and lock the spokes in place.

It is not absolutely necessary that both tenons $c$ and $c'$ be made larger than their respective sockets and afterward compressed, as a compression of one of the tenons and subsequent expansion thereof will answer the purpose, and hence I would have it understood that I do not confine myself to the exact construction of parts herein shown and described, but consider myself at liberty to make such slight changes as fairly fall within the spirit and scope of my invention.

Having fully described my invention, what I claim as new, and desire to secure by Letters Patent, is—

1. In a vehicle-wheel, the combination, with a hub having double sockets therein and a band or shell surrounding the hub, of spokes having double tenons on their inner ends, the outer or larger tenons of which are compressed before they are inserted in their sockets.

2. In a vehicle-wheel, the combination, with a hub having double sockets therein and a band surrounding the hub, of spokes having double tenons on the inner ends, which latter are larger than their respective sockets and are compressed before they are inserted in their sockets, substantially as set forth.

3. In a vehicle-hub, the combination, with a hub having double sockets therein and a band surrounding the hub, and provided with inwardly-projecting longitudinal ribs forming the side walls of the outer series of sockets, spokes having double-tenoned inner ends, which latter are larger than their respective sockets and are compressed before they are inserted in their sockets.

4. In a vehicle-wheel, the combination, with a hub having sockets therein and a band surrounding the hub and provided with inwardly-projecting longitudinal ribs, the inner faces of which are slightly undercut, of spokes secured in said sockets.

5. In a vehicle-wheel, the combination, with a hub having sockets therein and a band surrounding the hub and provided with inwardly-projecting longitudinal ribs, of spokes having tenons thereon, which latter are larger than their corresponding sockets and are compressed before they are inserted in said sockets.

In testimony whereof I have signed this specification in the presence of two subscribing witnesses.

JARED MARIS.

Witnesses:
FRANCIS S. BROWN,
ARTHUR M. WARE.